(12) United States Patent
Obembe et al.

(10) Patent No.: US 10,425,274 B2
(45) Date of Patent: Sep. 24, 2019

(54) TECHNIQUES AND ARCHITECTURES FOR RECOVERING FROM A SERVICE DISRUPTION IN A MULTI-SERVER ENVIRONMENT

(71) Applicant: salesforce.com, inc., San Francisco, CA (US)

(72) Inventors: Olumayokun Obembe, Concord, CA (US); Chen Liu, San Mateo, CA (US); Ping-Hsiu Hsieh, San Francisco, CA (US); Ashwini Bijwe, Hayward, CA (US); Vijayanth Devadhar, Fremont, CA (US); Mikhail Chainani, San Francisco, CA (US); Sridevi Gopala Krishnan, Foster City, CA (US); Alan Arbizu, Foster City, CA (US); Jesse Collins, Oakland, CA (US)

(73) Assignee: salesforce.com, inc., San Francisco, CA (US)

( * ) Notice: Subject to any disclaimer, the term of this patent is extended or adjusted under 35 U.S.C. 154(b) by 136 days.

(21) Appl. No.: 15/804,254

(22) Filed: Nov. 6, 2017

(65) Prior Publication Data
US 2018/0331887 A1 Nov. 15, 2018

Related U.S. Application Data

(60) Provisional application No. 62/505,047, filed on May 11, 2017.

(51) Int. Cl.
*G06F 11/07* (2006.01)
*H04L 12/24* (2006.01)

(52) U.S. Cl.
CPC ...... *H04L 41/0654* (2013.01); *G06F 11/0709* (2013.01); *G06F 11/0757* (2013.01); *G06F 11/0793* (2013.01)

(58) Field of Classification Search
CPC .. G06F 11/709; G06F 11/793; G06F 11/1458; G06F 11/3664; H04L 41/0654; H04L 43/0811; H04L 43/0817
See application file for complete search history.

(56) References Cited

U.S. PATENT DOCUMENTS 5,577,188 A  11/1996  Zhu
5,608,872 A  3/1997  Schwartz et al.
(Continued)

OTHER PUBLICATIONS

Non-Final Office Action for U.S. Appl. No. 15/862,525 dated Jun. 27, 2019, 10 pages.

*Primary Examiner* — Nadeem Iqbal
(74) *Attorney, Agent, or Firm* — Jaffery, Watson, Mendonsa & Hamilton, LLP

(57) ABSTRACT

Techniques and architectures to provide multiple application servers each having at least one connection agent and at least one enabler agent and at least one database organized as multiple nodes. An error condition between a first connection agent and a first database node is detected. The first connection agent indicates that the first database node is unavailable to stop attempts to access the first database node by a first application server. A first enabler agent periodically checks availability of the first database node. The first database node is indicated as available in response to a pre-selected number of successful attempts to contact the first database node with the first enabler agent. The first database node is accessed with the application server in response to the indication that the first database node is available.

15 Claims, 7 Drawing Sheets

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,243,093 B2 * | 7/2007 | Cragun .............. G06F 16/2471 |
| 7,289,976 B2 | 10/2007 | Kihneman et al. |
| 7,340,411 B2 | 3/2008 | Cook |
| 7,539,746 B2 | 5/2009 | Bankier et al. |
| 7,620,655 B2 | 11/2009 | Larsson et al. |
| 9,582,367 B2 * | 2/2017 | An ..................... G06F 11/1435 |
| 9,723,009 B2 * | 8/2017 | Makhervaks ....... H04L 63/0236 |
| 10,025,839 B2 * | 7/2018 | Dahan .................. G06F 16/256 |
| 10,033,603 B2 | 7/2018 | Gurdasani et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0154236 A1 * | 8/2003 | Dar ..................... H04L 67/1002 709/201 |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0162836 A1 | 8/2004 | Aronoff et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0219972 A1 * | 9/2007 | Cragun .............. G06F 16/2471 |
| 2009/0177744 A1 | 7/2009 | Marlow et al. |
| 2009/0201799 A1 | 8/2009 | Lundström et al. |
| 2013/0325828 A1 | 12/2013 | Larson et al. |
| 2014/0074717 A1 | 3/2014 | Evans |
| 2014/0075017 A1 | 3/2014 | Wang et al. |
| 2015/0301910 A1 | 10/2015 | Sathyanarayana et al. |
| 2015/0317221 A1 | 11/2015 | Sampath et al. |
| 2016/0072817 A1 * | 3/2016 | Makhervaks ....... H04L 63/0236 726/3 |
| 2016/0085646 A1 | 3/2016 | Joshi et al. |
| 2017/0017562 A1 | 1/2017 | Gulkis et al. |
| 2017/0213046 A1 | 7/2017 | Kaduluri et al. |
| 2017/0302673 A1 * | 10/2017 | Makhervaks ....... H04L 63/0236 |
| 2018/0239677 A1 | 8/2018 | Chen et al. |
| 2018/0331887 A1 | 11/2018 | Obemloe et al. |

\* cited by examiner

(12) United States Patent
US 10,425,274 B2

TECHNIQUES AND ARCHITECTURES FOR RECOVERING FROM A SERVICE DISRUPTION IN A MULTI-SERVER ENVIRONMENT

CLAIM OF PRIORITY

This application claims the benefit of U.S. Provisional Patent Application No. 62/505,047 entitled "ENABLER", filed May 11, 2017, the entire contents of which are incorporated herein by reference.

TECHNICAL FIELD

Embodiments relate to techniques for managing server availability in a multiserver environment. More particularly, embodiments relate to techniques for more accurately monitoring and flagging service disruptions within a multi-server environment.

BACKGROUND

A "split-brain" condition can exist in response to data or availability inconsistencies from inconsistent, overlapping data sets. For example, in a multiple server environment when not all application servers have the same view of shared database nodes, a split-brain condition can exist from different application servers having different determinations of the availability of individual database nodes. This can result in inefficiencies when human intervention is required to reset database nodes or take other corrective action.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known structures and techniques have not been shown in detail in order not to obscure the understanding of this description.

Figure 1:
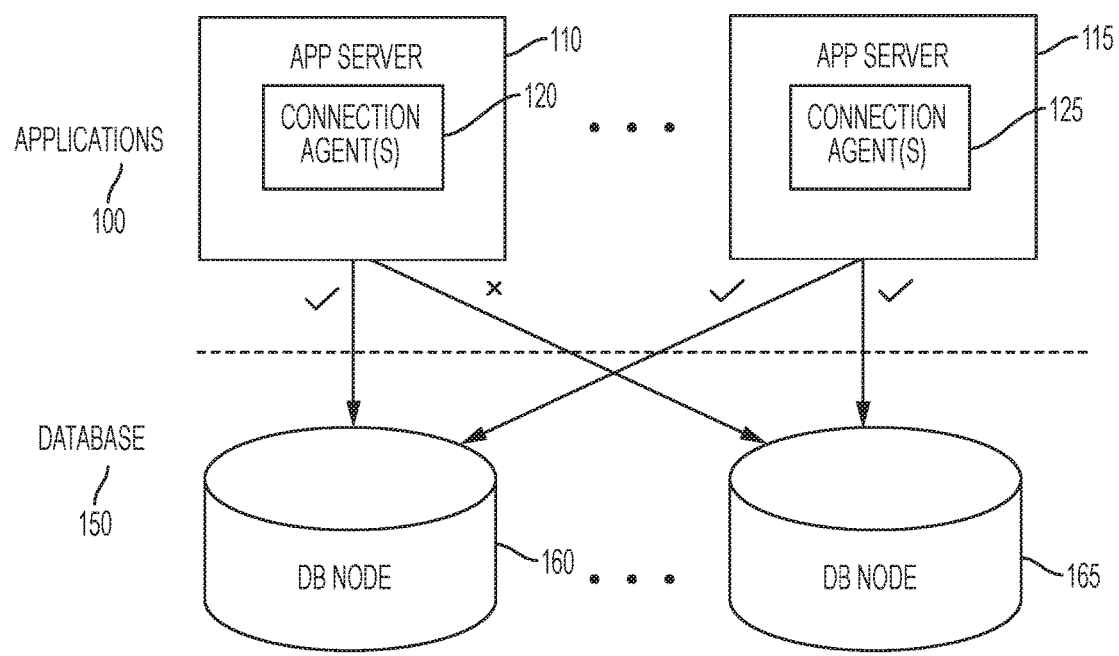
FIG. 1 is one embodiment a system having multiple application servers and multiple database nodes.

FIG. 1 is one embodiment a system having multiple application servers and multiple database nodes. The example of FIG. 1 includes just two app servers and two database nodes, but any number of app servers and any number of database nodes can be supported.

The example of FIG. 1 illustrates a situation in which a split-brain condition can exist. Applications 100 can utilize database 150, for example, the applications can be web-based applications that provide services that utilize database 150. In one embodiment, applications 100 and database 150 can be part of an on-demand services environment. Embodiments of an on-demand services environment are provided in greater detail below.

In one embodiment, each app server (e.g., 110, 115) includes at least a connection agent (e.g., 120, 125). The connection agents function to monitor connections to one or more database nodes (e.g., 160, 165). In one embodiment, each app server includes one connection agent per database node. Under normal operation, connection agents 120 and 125 manage connections between app servers 110 and 115, respectively, and indicate when connections are active. Under certain conditions connection agent 120 may have an active connection to database node 160, but may mark database node 165 unavailable. This can happen, for example, if a database node is busy and is slow to respond to one or more requests.

Similarly, connection agent 125 can manage active connections to both database nodes 160 and 165. This can result in a split-brain connection when connection agent 120 flags database node 165 as not available and connection agent 125 flags database node 165 as available. This condition is typically corrected by restarting app server 110, which can be time-consuming and labor intensive. In more complex systems the split-brain condition can be much more complex and much more difficult to correct.

Figure 2:
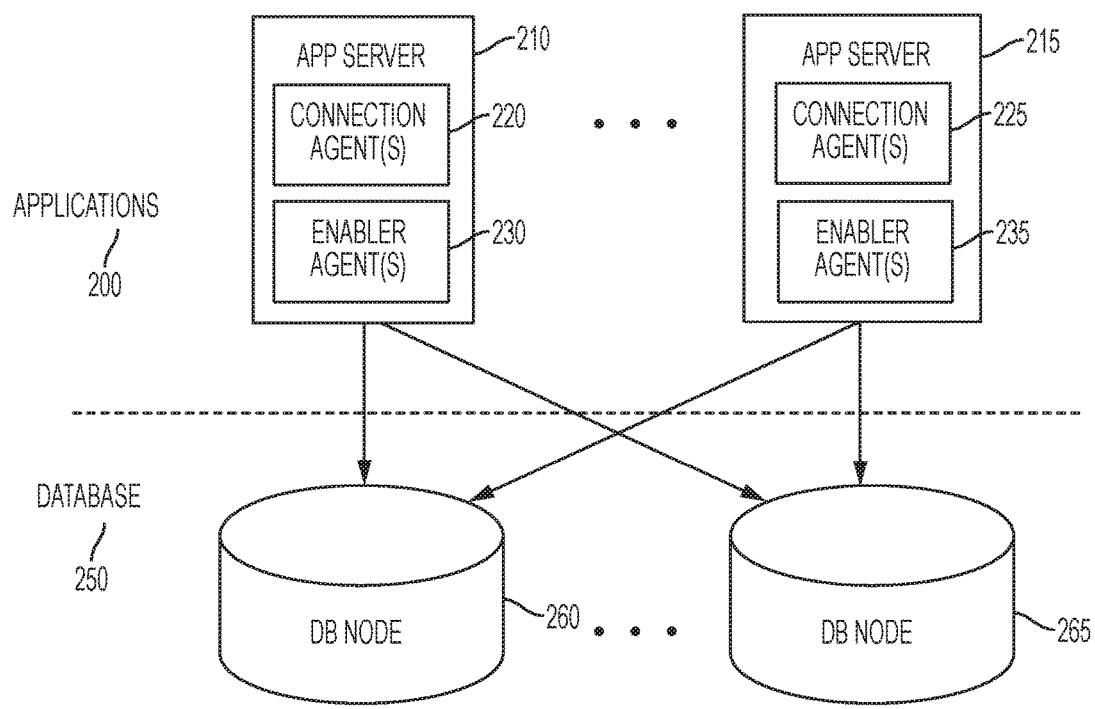
FIG. 2 is one embodiment a system having multiple application servers and multiple database nodes where the application servers include one or more enabler agents.

FIG. 2 is one embodiment a system having multiple application servers and multiple database nodes where the application servers include one or more enabler agents. The example of FIG. 2 includes just two app servers and two database nodes, but any number of app servers and any number of database nodes can be supported.

The example of FIG. 2 illustrates a situation in which a split-brain condition can exist and be handled through one or more enabler agents. Applications 200 can utilize database 250, for example, the applications can be web-based applications that provide services that utilize database 250. In one embodiment, applications 200 and database 250 can be part of an on-demand services environment. Embodiments of an on-demand services environment are provided in greater detail below.

In one embodiment, each app server (e.g., 210, 215) includes at least a connection agent (e.g., 220, 225) and at least one enabler agent (e.g., 230, 235). The connection agents function to monitor connections to one or more database nodes (e.g., 260, 265). In one embodiment, each app server includes one connection agent per database node. Under normal operation, connection agents 220 and 225 manage connections between app servers 210 and 215, respectively, and indicate when connections are active.

In one embodiment, the enabler agents provide monitoring functionality when a database node has been flagged as unavailable by one of the connection agents. In one embodiment, the enabler agents provide the functionality described herein to determine if the database nodes that have been flagged as unavailable are consistently available (or "healthy"). When the enabler agent determines that a database node is healthy and available the corresponding app server can access the database node again without restart of the app server or the database node.

For example, under certain conditions connection agent 220 may have an active connection to database node 260, but may mark database node 265 unavailable. This can happen, for example, if a database node is busy and is slow to respond to one or more requests. Concurrently, connection agent 225 can manage active connections to both database nodes 260 and 265. This can result in a split-brain connection when connection agent 220 flags database node 265 as not available and connection agent 225 flags database node 265 as available.

In response to this condition, enabler agent 230 can begin the functionality described herein and enabler agent 235 does not. In various embodiments, enabler agent 230 periodically (e.g., every 5 seconds, every 15 seconds, every minute) checks to determine if database node 265 is available. When enabler agent 230 determines that database node 265 is available for a pre-selected number of consecutive attempts (e.g., 5, 10, 20) enabler agent 230 can remove the unavailable flag/designation from connection agent 220. Connection agent 220 can then access database node 265 again.

In one embodiment, if enabler agent 230 attempts to access database node 265 for a pre-selected number of times (e.g., 10, 20, 25) without success, enabler agent 230 can escalate the recovery. For example, enabler agent 230 can cause app server 210 to be restarted, enabler agent 230 can cause database node 260 to be restarted, enabler agent 230 can notify one or more system administrators, etc. Situations in which a database node is intermittently available and unavailable can be referred to as "floppiness" and can be handled using various strategies discussed below.

Figure 3:
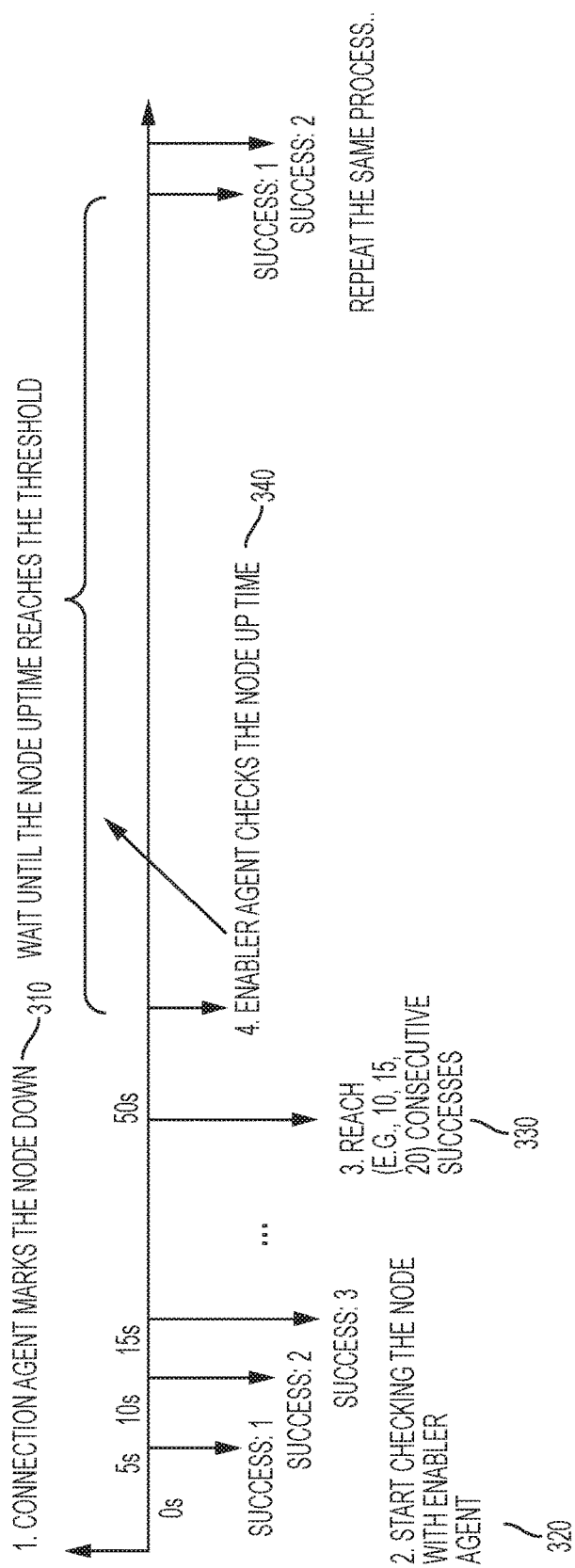
FIG. 3 is a timing diagram of one embodiment of a technique for recovering from a split-brain condition.

FIG. 3 is a timing diagram of one embodiment of a technique for recovering from a split-brain condition. The example of FIG. 3 describes operation of an enabler agent associated with an app server where the connection between the app server and a database node has been marked down (or unavailable).

At time T0, the connection agent marks the database node as down, 310. The can be accomplished, for example, by pinging the database node to see if the node is available, or by monitoring a response time to a request, etc. As discussed above, using traditional techniques this action would require restarting of the app server, the database node and/or other components to recover from the detected condition.

In response to the database node being marked as down (or unavailable), the corresponding enabler agent can start checking availability of the database node, 320. The example of FIG. 3 shows immediate successes; however, any number of failures can occur before successful checks occur. For example, a database node may be down for 45 seconds and checks may occur every 5 seconds. Thus, up to 9 failures may occur before a successful check occurs. In one embodiment, the enabler agent continues to check node availability until a pre-selected number (e.g., 10, 15, 23, 40) of consecutive successful checks have occurred. In one embodiment, in response to a pre-selected number (e.g., 25, 45, 100) of consecutive unsuccessful checks, the enabler agent can change the response strategy, for example, by causing the app server and/or the database node to be restarted.

In one embodiment, when a pre-selected number of consecutive successes have occurred (330), the enabler agent can check to determine if the database node uptime has met or exceeded a pre-selected threshold (e.g., 5 minutes, 2 minutes, 45 seconds, 8 minutes), 340. If the pre-selected threshold uptime has not been met, the enabler agent can wait for the time to elapse while continuing to check availability. Alternatively, if the pre-selected threshold uptime has not been met, the enabler agent can wait for the time to elapse and check again at the end of the time period.

If the database node availability passes the various checks, it can be marked as available and the app server can use the database node again. Thus, the app server and database node can recover from the unavailability without restarting of either or human interaction, which results in a more efficient recovery process.

Use of this uptime threshold (along with, or in combination with the other pre-selected values) can avoid the database node alternating between being considered available and being considered unavailable, which can be referred to as "flappiness." In one embodiment, if any of the process described with respect to FIG. 3 fails, for example, not enough consecutive check successes, the complete process can begin again. In alternate embodiments, the process can be rolled back and a stage, for example, consecutive uptime, can begin again.

Figure 4:
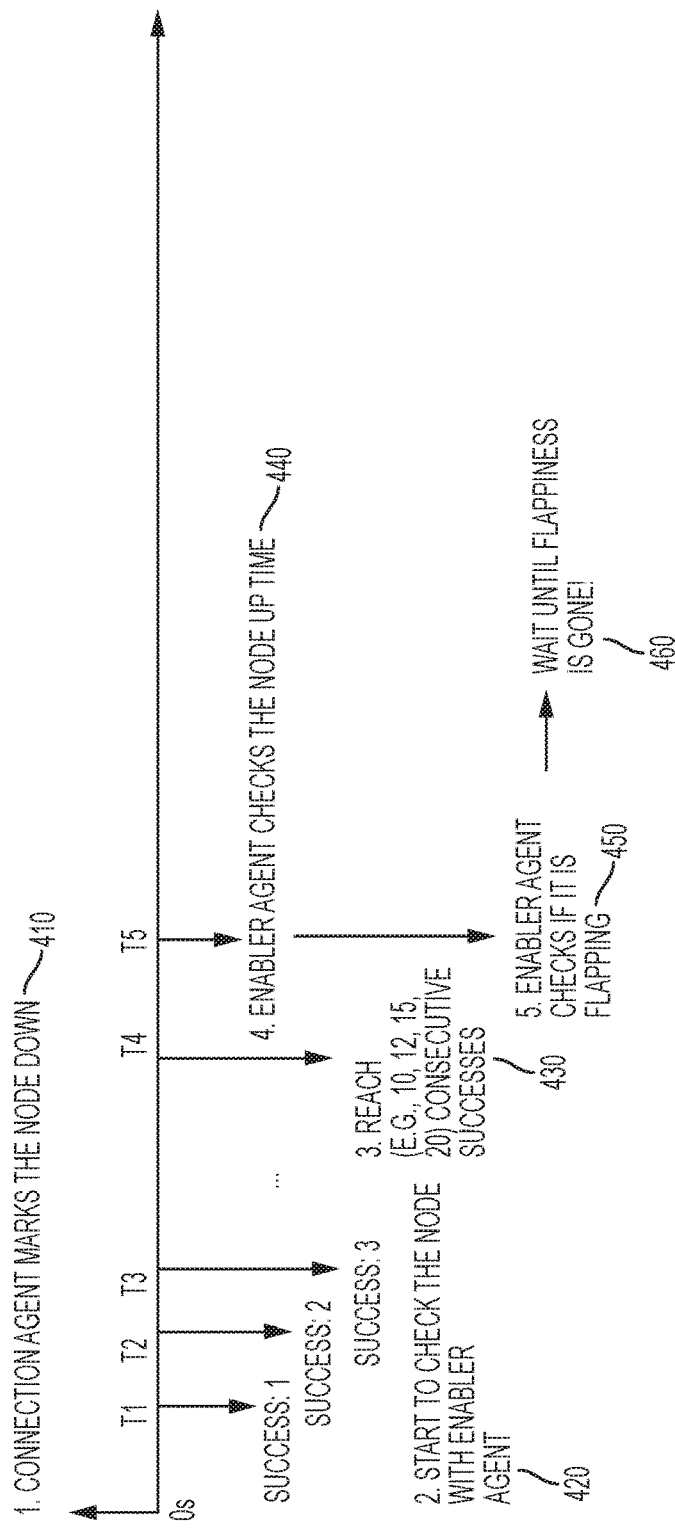
FIG. 4 is a timing diagram of one embodiment of a technique for recovering from a split-brain condition.

FIG. 4 is a timing diagram of one embodiment of a technique for recovering from a split-brain condition. The example of FIG. 4 describes operation of an enabler agent associated with an app server where the connection between the app server and a database node has been marked down (or unavailable).

At time T0, the connection agent marks the database node as down, 410. The can be accomplished, for example, by pinging the database node to see if the node is available, or by monitoring a response time to a request, etc. As discussed above, using traditional techniques this action would require restarting of the app server, the database node and/or other components to recover from the detected condition.

In response to the database node being marked as down (or unavailable), the corresponding enabler agent can start checking availability of the database node, 420. The example of FIG. 4 shows immediate successes; however, any number of failures can occur before successful checks occur. In one embodiment, the enabler agent continues to check node availability until a pre-selected number (e.g., 10, 15, 23, 40) of consecutive successful checks have occurred. In one embodiment, in response to a pre-selected number (e.g., 25, 45, 100) of consecutive unsuccessful checks, the enabler agent can change the response strategy, for example, by causing the app server and/or the database node to be restarted.

In one embodiment, when a pre-selected number of consecutive successes have occurred (430), the enabler agent can check to determine the database node uptime (e.g., 5 minutes, 2 minutes, 45 seconds, 8 minutes), 440. The enabler agent can check the database node for signs of "flapping" to determine if the database node is stable enough to be marked as available for use by the app server. As discussed above, a database node uptime can be utilized to determine flappiness. Other factors can also be used including, for example, response time, bandwidth utilization, etc. If one or more factors indicate flappiness, the enabler agent can continue to monitor one or more factors to determine when the flappiness is gone before marking the database node as available again. In one embodiment, if there are no signs of flappiness, 450, the database node can be marked as available without the waiting period (460).

In one embodiment, if any of the process described with respect to FIG. 4 fails, for example, not enough consecutive check successes, the complete process can begin again. In alternate embodiments, the process can be rolled back and a stage, for example, consecutive uptime, can begin again.

Figure 5:
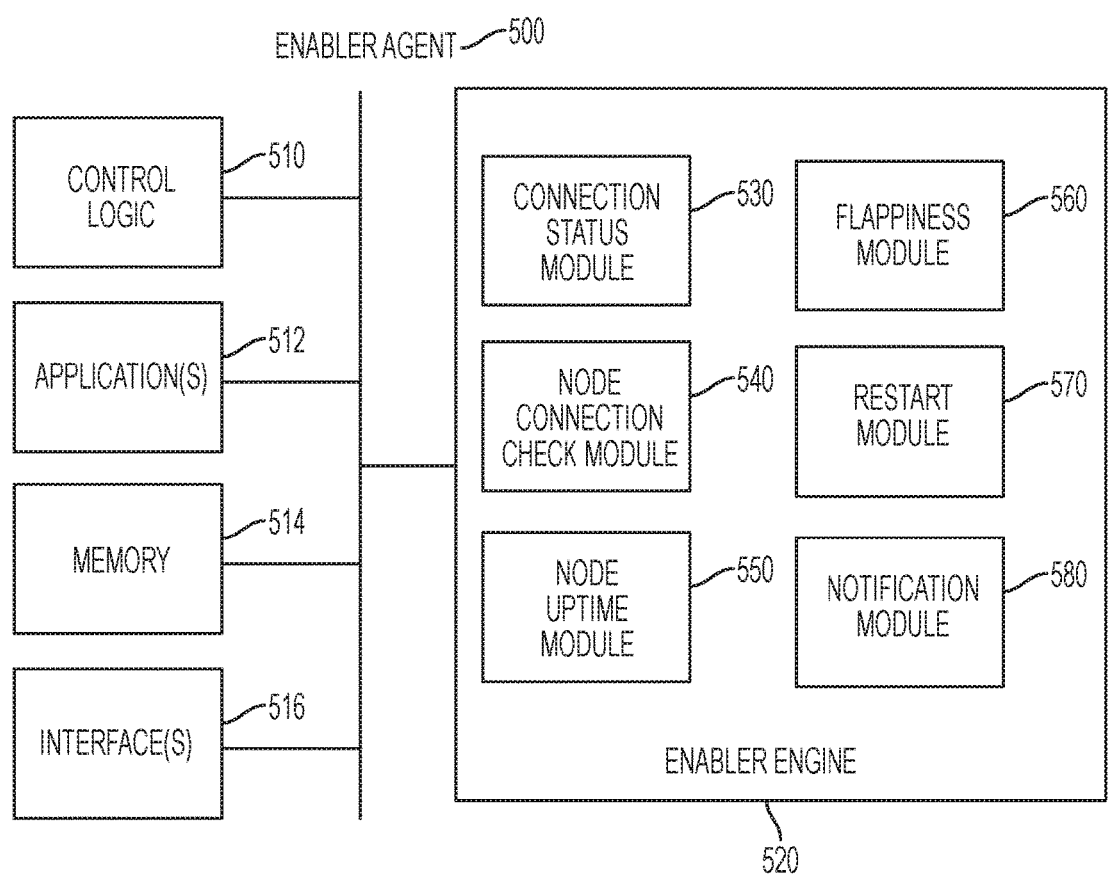
FIG. 5 is a block diagram of one embodiment of an enabler agent.

FIG. 5 is a block diagram of one embodiment of an enabler agent. The functionality of enabler agent 500 can be provided as part of a multitenant database environment, or a non-multitenant database environment.

Enabler agent 500 includes control logic 510, which implements logical functional control to direct operation of enabler agent 500, and/or hardware associated with directing operation of enabler agent 500. Logic may be hardware logic circuits and/or software routines. In one embodiment, enabler agent 500 includes one or more applications 512, which represent code sequence and/or programs that provide instructions to control logic 510.

Enabler agent 500 includes memory 514, which represents a memory device and/or access to a memory resource for storing data and/or instructions. Memory 514 may include memory local to enabler agent 500, as well as, or alternatively, including memory of the host system on which enabler agent 500 resides. In one embodiment, enabler agent 500 also includes one or more interfaces 516, which represent access interfaces to/from (an input/output interface) enabler agent 500 with regard to entities (electronic or human) external to enabler agent 500.

Figure 6:
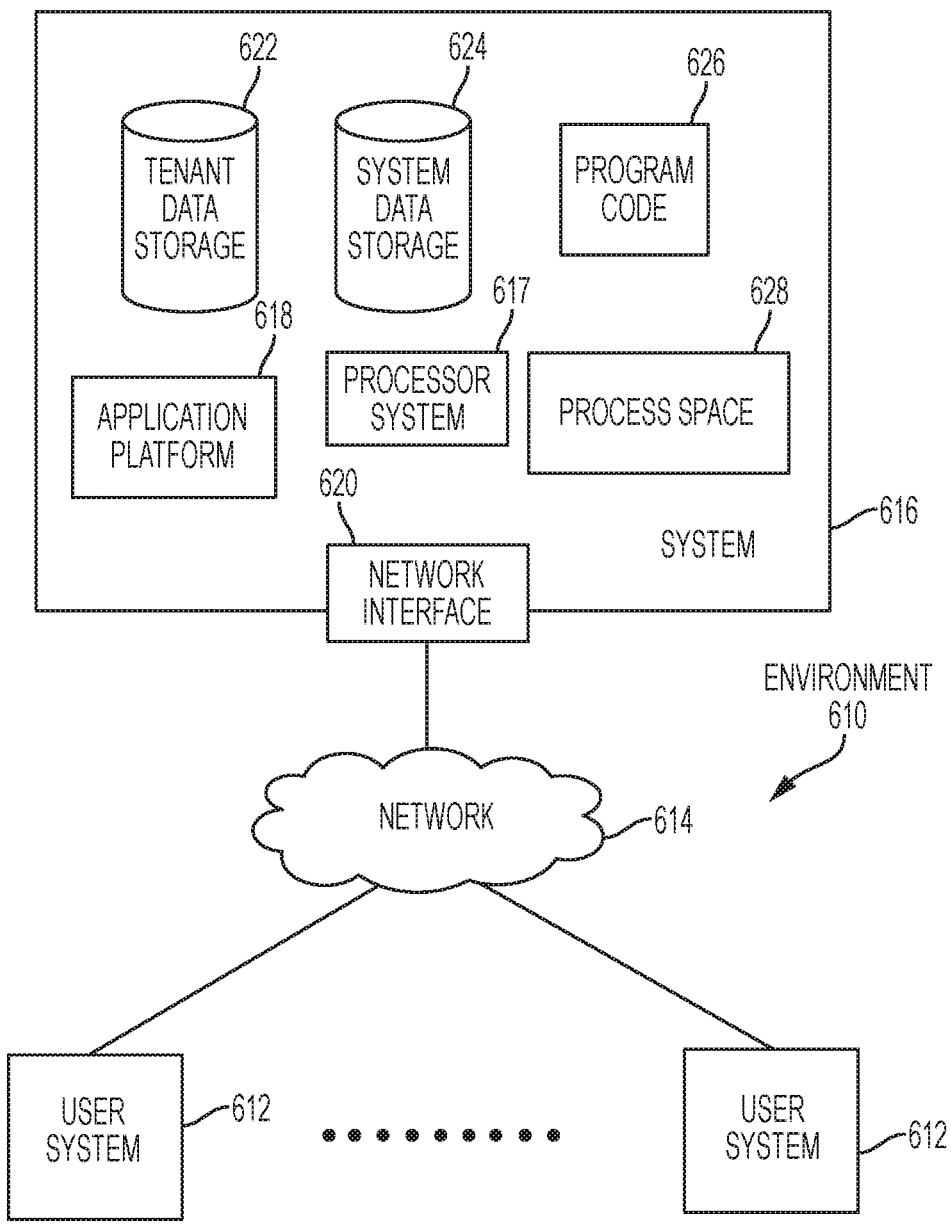
FIG. 6 illustrates a block diagram of an environment where an on-demand database service might be used.

Enabler agent 500 also includes enabler engine 520, which represents one or more functions or modules that enable enabler agent 500 to provide the backup/copy/storage/transmission services as described above. The example of FIG. 6 provides several modules that may be included in enabler engine 520; however, different and/or additional modules may also be included.

Example modules that may be involved in providing the functionality described herein include connection status module 530, node connection check module 540, node uptime module 550, flappiness module 560, restart module 570 and/or notification module 580. Additional modules not illustrated may also be included to provide additional/different functionality. Each of these modules may further include other sub-modules to provide other functions. As used herein, a module refers to routine, a subsystem, logic circuit, microcode, etc., whether implemented in hardware, software, firmware or some combination thereof.

In one embodiment, connection status module monitors the status of the database node as indicated by, for example, a connection agent. In one embodiment, when the database is functioning and available to the app server enabler agent 500 does not actively check the status of the database nodes. In one embodiment, when the connection agent (or other entity) marks the database node as down (or unavailable), connection status module 530 causes enabler agent 500 to perform the operations discussed above.

In one embodiment, node connection check module 540 operates to cause enabler agent 500 to check the status/availability of the database node in response to the database node being down/unavailable. Node connection agent module 540 can operate to perform the checking functionality as described above. To perform these operations, enabler agent 500 can interact through, for example, interface(s) 516 and/or utilize memory 514.

In one embodiment, node uptime module 550 can monitor database node uptime as described above. For example, in response to node connection check module 540 processing sufficient consecutive successful database checks, node uptime module 550 can determine a consecutive database uptime, which can be utilized to determine flappiness, for example.

In one embodiment, flappiness module 560 operates to monitor flappiness of the database module. As discussed above, this can be based on database node uptime and/or other characteristics. In one embodiment, flappiness module 560 can operate to delay marking the database node as available if it determines that there is (or may be) flappiness in the availability of the database node.

In one embodiment, restart module 570 operates to cause an app server, a database node, or other components to be restarted. This can occur, for example, if the processes described above do not successfully result in the database node being available to the app server. In one embodiment, notification module 580 operates to cause notification to be provided to one or more entities (e.g., system administrator, account owner) in response to the status of the database node.

FIG. 6 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in herein FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Edge from Microsoft, Safari from Apple, Chrome from Google, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Core series processor or the like. Similarly, system 616 (and additional instances of an MTS, where more than one is present) and all of their components might be operator configurable using application(s) including computer code to run using a central processing unit such as processor system 617, which may include an Intel Core series processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
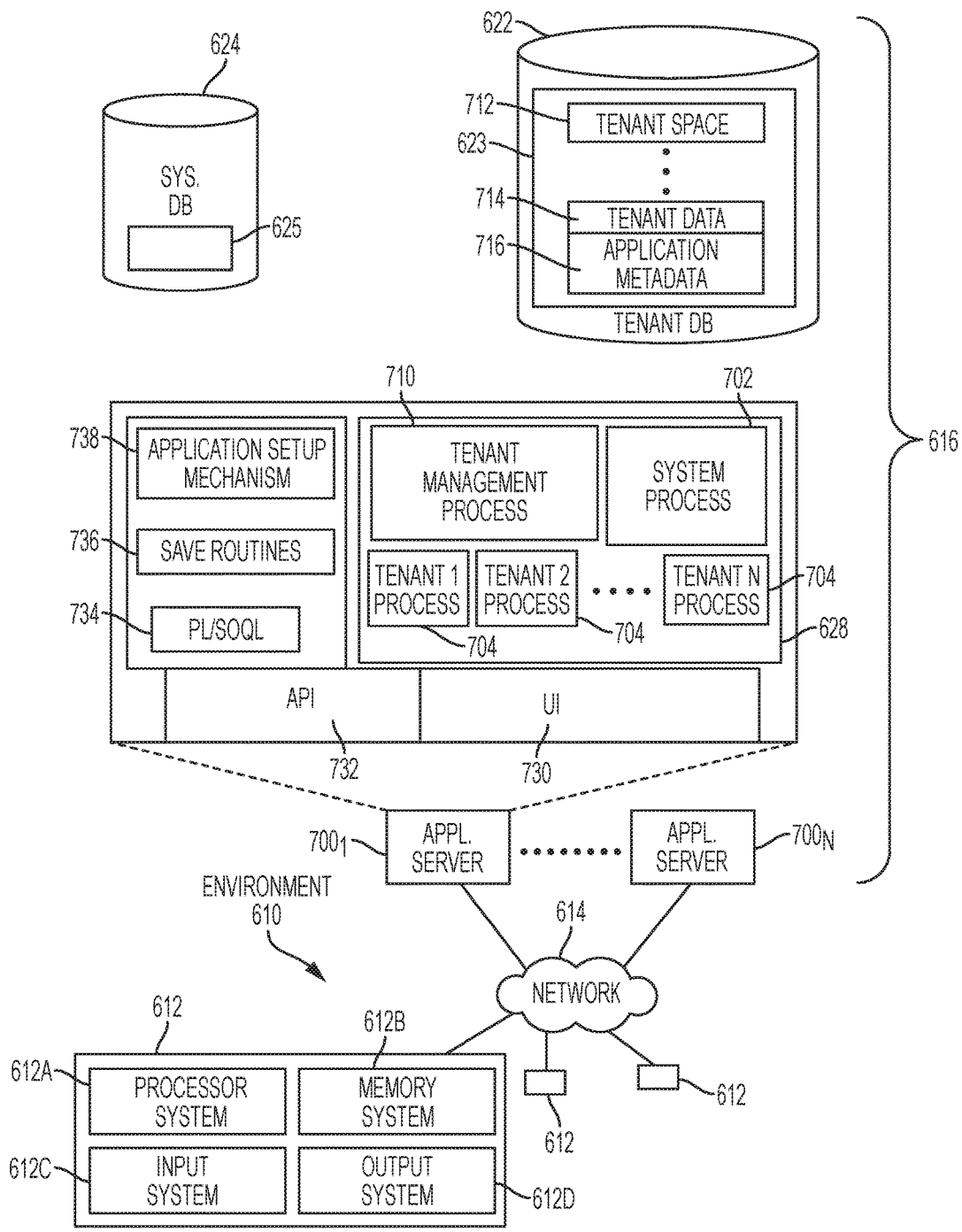
FIG. 7 illustrates a block diagram of an environment where an on-demand database service might be used.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $700_1$-$700_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 BIG-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method in a computing environment having multiple application servers each having at least one connection agent and at least one enabler agent, the computing environment to be executed by one or more hardware processing components coupled with at least one memory device, the computing environment further having at least one database organized as multiple nodes, the method comprising:

detecting an error condition between a first connection agent and a first database node;

indicating, with the first connection agent, that the first database node is unavailable to stop attempts to access the first database node by a first application server;

checking periodically, with a first enabler agent, availability of the first database node;

indicating that the first database node is available in response to a pre-selected number of successful attempts to contact the first database node with the first enabler agent;

accessing the first database node with the application server in response to the indication that the first database node is available.

2. The method of claim 1 wherein the error condition comprises a connection between the first connection agent and the first database node being non-responsive.

3. The method of claim 1 wherein the error condition comprises the first database node being unavailable.

4. The method of claim 1 further comprising:
determining a total uptime for the database node in response to at least one successful contact with the enabler agent;
wherein the indication that the first database node is available is in response to a pre-selected number of successful attempts to contact the database node with the enabler agent and the total uptime for the database node exceeding a pre-selected threshold value.

5. The method of claim 1, wherein the computing environment further comprises at least a second enabler agent, a second connection agent and a second application server that operate independently of the first enabler agent, the first connection agent and the first application server, the method comprising:
detecting an error condition between the second connection agent and the first database node;
indicating, with the second connection agent, that the first database node is unavailable to stop attempts to access the first database node by the second application server;
checking periodically, with the second enabler agent, availability of the first database node;
indicating that the first database node is available in response to a pre-selected number of successful attempts to contact the first database node with the second enabler agent;
accessing the first database node with the second application server in response to the indication that the first database node is available.

6. A non-transitory computer-readable medium to provide, in a computing environment having multiple application servers each having at least one connection agent and at least one enabler agent, the computing environment to be executed by one or more hardware processing components coupled with at least one memory device, the computing environment further having at least one database organized as multiple nodes, instructions that, when executed by one or more processors, are configurable to cause the one or more processors to:
detect an error condition between a first connection agent and a first database node;
indicate, with the first connection agent, that the first database node is unavailable to stop attempts to access the first database node by a first application server;
check periodically, with a first enabler agent, availability of the first database node;
indicate that the first database node is available in response to a pre-selected number of successful attempts to contact the first database node with the first enabler agent;
access the first database node with the application server in response to the indication that the first database node is available.

7. The non-transitory computer-readable medium of claim 6 wherein the error condition comprises a connection between the first connection agent and the first database node being non-responsive.

8. The non-transitory computer-readable medium of claim 6 wherein the error condition comprises the first database node being unavailable.

9. The non-transitory computer-readable medium of claim 6 further comprising instructions that, when executed by the one or more processors, are configurable to cause the one or more processors to:
determine a total uptime for the database node in response to at least on successful contact with the enabler agent;
wherein the indication that the first database node is available is in response to a pre-selected number of successful attempts to contact the database node with the enabler agent and the total uptime for the database node exceeding a pre-selected threshold value.

10. The non-transitory computer-readable medium of claim 6, wherein the computing environment further comprises at least a second enabler agent, a second connection agent and a second application server that operate independently of the first enabler agent, the first connection agent and the first application server, the instructions, when executed by the one or more processors, are configurable to cause the one or more processors to:
detect an error condition between the second connection agent and the first database node;
indicate, with the second connection agent, that the first database node is unavailable to stop attempts to access the first database node by the second application server;
check periodically, with the second enabler agent, availability of the first database node;
indicate that the first database node is available in response to a pre-selected number of successful attempts to contact the first database node with the second enabler agent;
access the first database node with the second application server in response to the indication that the first database node is available.

11. A system comprising a computing environment having multiple application servers each having at least one connection agent and at least one enabler agent, the computing environment to be executed by one or more hardware processing components coupled with at least one memory device, the computing environment further having at least one database organized as multiple nodes, the system having one or more processors configurable to:
detect an error condition between a first connection agent and a first database node;
indicate, with the first connection agent, that the first database node is unavailable to stop attempts to access the first database node by a first application server;
check periodically, with a first enabler agent, availability of the first database node;
indicate that the first database node is available in response to a pre-selected number of successful attempts to contact the first database node with the first enabler agent;
access the first database node with the application server in response to the indication that the first database node is available.

12. The system of claim 11 wherein the error condition comprises a connection between the first connection agent and the first database node being non-responsive.

13. The system of claim 11 wherein the error condition comprises the first database node being unavailable.

14. The system of claim 11, wherein the one or more processors are further configurable to determine a total uptime for the database node in response to at least one successful contact with the enabler agent, wherein the indication that the first database node is available is in response to a pre-selected number of successful attempts to contact the database node with the enabler agent and the total uptime for the database node exceeding a pre-selected threshold value.

15. The system of claim 11, wherein the computing environment further comprises at least a second enabler agent, a second connection agent and a second application server that operate independently of the first enabler agent, the first connection agent and the first application server, the system further configurable to:
- detect an error condition between the second connection agent and the first database node;
- indicate, with the second connection agent, that the first database node is unavailable to stop attempts to access the first database node by the second application server;
- check periodically, with the second enabler agent, availability of the first database node;
- indicate that the first database node is available in response to a pre-selected number of successful attempts to contact the first database node with the second enabler agent;
- access the first database node with the second application server in response to the indication that the first database node is available.

\* \* \* \* \*